Aug. 26, 1952     P. SCHLUMBOHM     2,608,321
WATER KETTLE

Filed Oct. 10, 1945     2 SHEETS—SHEET 1

INVENTOR.

Aug. 26, 1952 P. SCHLUMBOHM 2,608,321
WATER KETTLE
Filed Oct. 10, 1945 2 SHEETS—SHEET 2
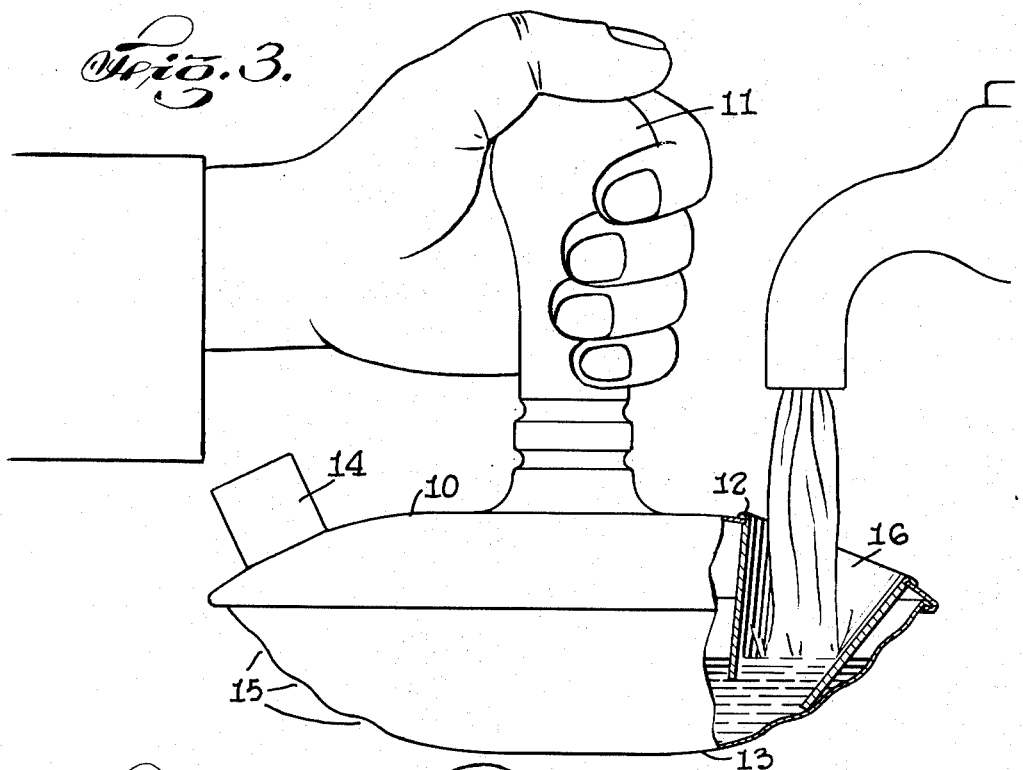
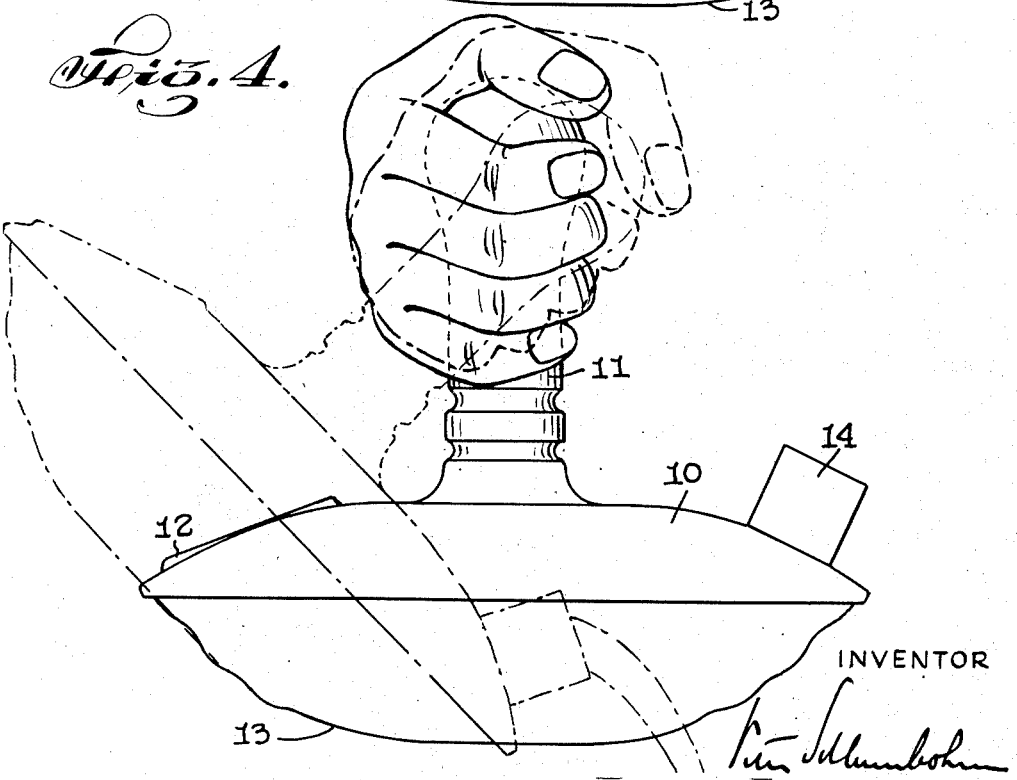
INVENTOR Patented Aug. 26, 1952

2,608,321

UNITED STATES PATENT OFFICE 2,608,321

WATER KETTLE

Peter Schlumbohm, New York, N. Y.

Application October 10, 1945, Serial No. 621,498

7 Claims. (Cl. 222—465)

The invention relates to dispensing devices, and more specifically the invention aims at a teakettle. The new teakettle allows a perfect and safe dispensing of the hot water, which shall be poured with accuracy and in small portions at a time on tea or coffee for making beverages.

The invention is illustrated by way of example in Fig. 1–Fig. 4 of the accompanying drawings.

Fig. 3 illustrates, partly in section, partly in view, how the kettle is held with the left hand and filled from the faucet;

Fig. 4 illustrates how the kettle is held with the right hand and indicates in dotted lines how a twist of the hand tilts the kettle into pouring position.

Figure 1:
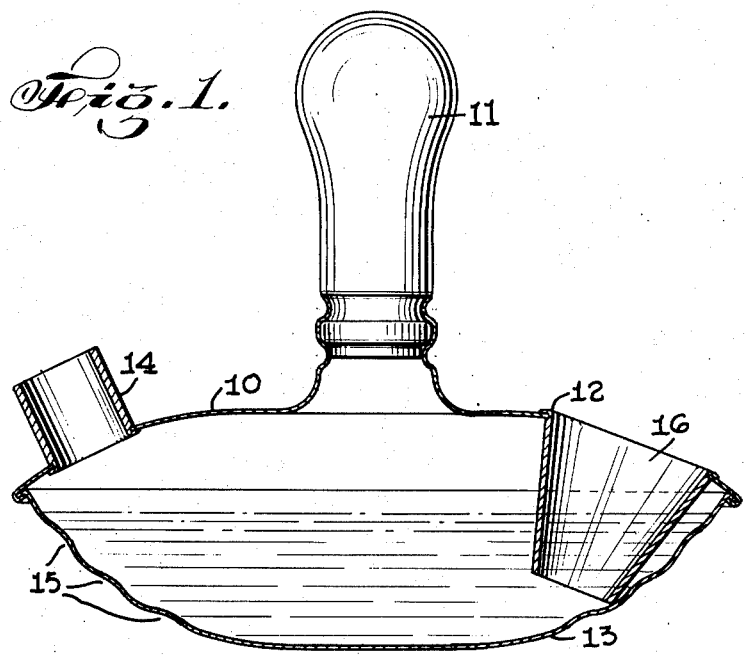
Fig. 1 shows the new kettle in vertical section, except for the handle, which is shown in view.
Figure 2:
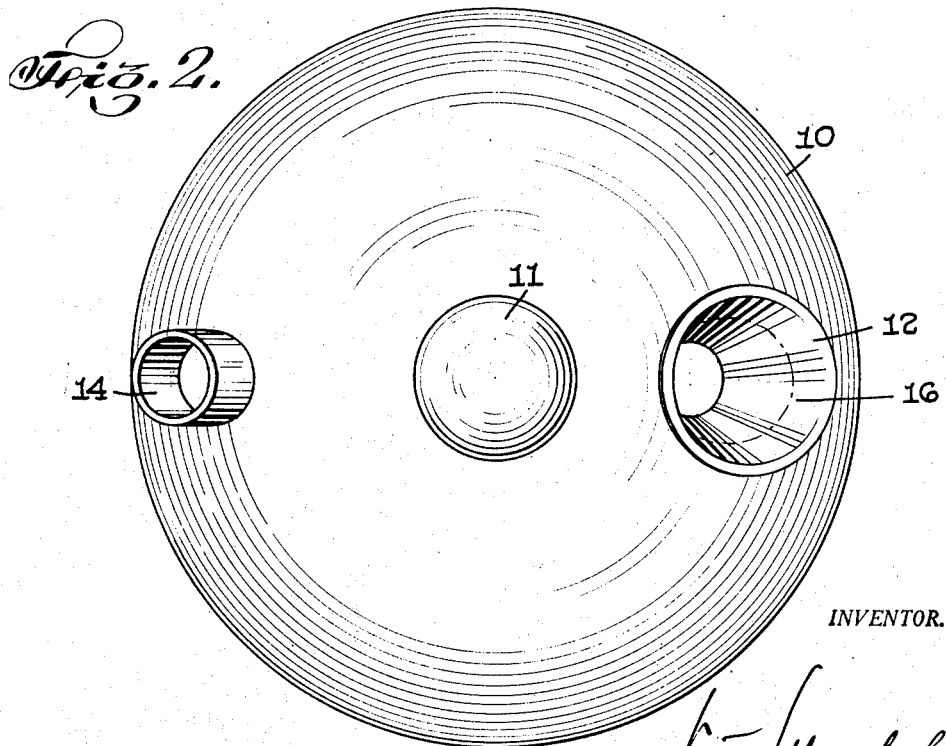
Fig. 2 is a top view of Fig. 1.

In view of the very simple mechanical characteristics of the kettle, the drawings are self-explanatory, especially, if the following description of the invention is considered:

Figs. 1 and 2 disclose one of the essential features of the invention in the form of a new type of handle or grip for kettles. This new handle improves the safety in handling the most dangerous element in every kitchen, which is a kettle with boiling water. Due to the new type grip, the full tilting angle is controlled from the elbow. Shoulder and upper arm do not change their position during the tilting movement, assuring a steadiness of the movement, which otherwise would become jerky by shifting from elbow to shoulder action.

Referring to Figs. 1 and 2, the kettle body 10 is shown receiving the handle 11, the vertical axis of the kettle body corresponding generally to the vertical axis of the handle. An inlet spout 12 is provided receiving liquid and is shown in the form of a truncated cone. A more complete description of this novel inlet construction will appear hereinbelow.

Referring again to the handle 11, it may be observed that the handle is where it logically belongs, that is, in the heat-shadow of the kettle and as far remote from the heating flame as possible.

Another novel feature of the kettle is the level control for determining the level of the water in the kettle. Visibility of the water level is a prime consideration in favor of glass kettles. The new all-encased metal kettle meets this requirement by a new mechanical feature which may be described as steamlock and is shown in Fig. 1–Fig. 3, consisting of a tubular element or fluid inlet spout 12 extending from the ceiling wall of the kettle body 10 down to a zone near the bottom wall 13 of the kettle. As shown in Fig. 3, water may be poured into the kettle through the rather wide opening of the tube 12. Due to this steamlock, steam cannot steam out of the wide opening. Thus, the hand can grip the handle 11 without being scalded by such steam. The small amount of steam, which evolves from the water within the tube 12 is negligible. This amount is furthermore held at a minimum by giving the tube a frusto-conical shape, as shown, so that only few steam bubbles from the main bulk of the water can enter into the lower open end of the tube. Narrowing the communication channel between the main bulk of the water and the water within the tube has the additional advantage of a brake effect and of slowing down the sway of the water in this system of two communicating tubes, when the kettle is handled. The arrangement of such a steamlock also is very useful for venting the kettle during the pouring. This vent results in a much smoother pouring action than the usual direct communication between the airspace of a container to be vented and the atmosphere. Under these circumstances, a pouring spout 14 can be designed for ideal hydrodynamic flow of liquid alone, without tolerances for water/air mixtures. The spout 14 is formed by a round tube, the length of which is equal to or just slightly larger than the inside diameter, thus rendering ideal precise pouring. It has been discovered that ideal pouring flow results from a balanced relation between the inside diameter of the spout 14 and the inside diameter of the lower open end of the steamlock tube 12. These two diameters should be of the same size to obtain best results.

For quantities of 1½ quarts as kettle capacity, it has been found that an inside diameter of one inch for the pouring spout 14 and for the lower opening of the steamlock tube gives perfect pouring results.

Next to facilitating filling and pouring, the invention aims at speedy boiling. As shown in the drawings, the kettle is shaped as a flat lens. The water is completely encased by metal walls, which are worked into one single piece. The bottom walls are corrugated, as shown at 15, to increase the surface of heat-exchange. For a capacity of 1½ quarts of water it has been found that a diameter of 9" for the lens-like body is practical. The lower part of the lens-like body has a height of 2" and the dome has a height of 1". Thus, an unusually large specific surface, surface per cubical content of water, is available for the contact with the flame. The drawings are ⅔ of the actual size of this example.

The new type grip described above has still one more advantage. Filling marks 16, such as shown in Fig. 2 as a dotted line inside the tube of the steamlock, read true only if the kettle is held level when holding it to the faucet. By holding the knob of the handle 11 loosely and thereby giving it the free movement of a universal joint or pendulum, a true vertical plumb of the kettle is effected, and thus the level mark 16 will be on the true horizon.

The invention is not limited to kettles made from metal, nor is the invention limited to kettles. The new type grip, the level control, and the liquid-locked vent of the pouring spout will be generally useful for dispensing devices.

The axis of the pouring spout 14 is substantially a tangent on a circle, the center point of which is where the center point of the palm of the hand grips the handle. In this way, the momentum of the water, when tilting the kettle, is best taken advantage of, with a minimum of eddying currents created. The spout is, therefore, in the path of that momentum.

One reason why the wide opening of the steamlock 12 does not need a lid to protect the hand against steam is that the mass of water within the steamlock 12 boils later than the main bulk of the water, due to the unfavorable heat transfer conditions created for this limited space. Here again, the provision of a narrow communication channel between the two water spaces shows its advantage, and the arrangement of funnel-shaped walls for the space of the steamlock appears to be the best technical solution for holding a limited amount of water with a minimum of convection in a restricted but communicating zone within the main bulk of the water.

The dome of the kettle 10 is designed as a shell, concave towards the inside of the kettle and convex at the outside. This convex outside has several technical advantages. Firstly, a straight tube can be used as the pouring spout and yet there is provided the desired angle for the spout, as defined above. Secondly, it allows a simple construction and fixation of the funnel-shaped walls of the steamlock 12. Finally, it radiates heat in directions other than toward the handle, and it furthermore protects the handle 11 against the hot off-gases of the heating flame, by creating aerodynamically good flow conditions which leave the handle in a quiet zone. A straight horizontal lid-dome would cause turbulence, which would lead the hot gases to flow over the handle.

Having now described the nature of my invention and given an example for the manner in which it may be performed, I claim as my invention:

1. A water kettle comprising a hollow body and a handle connected to said body, said hollow body comprising a relatively shallow curved lens shaped bottom, a fixed generally flat cover for said bottom sealed to the bottom about the periphery thereof, said cover being provided with a pouring spout located near the periphery thereof and extending upwardly therefrom and with a filling and venting opening near the periphery thereof and in spaced relation from said pouring spout extending downwardly therefrom to a zone near the said bottom, said handle comprising a rod-like element having a vertical axis, the lower end of which is secured to said body and generally centrally disposed with respect to said cover.

2. A water kettle as described in claim 1, said filling and venting opening comprising a tube open at both ends and extending from said cover downwardly to a level which is normally below the level of liquid normally contained in said kettle.

3. A water kettle as described in claim 2, the top end of said tube being formed with a larger opening than the bottom of said tube.

4. A water kettle as described in claim 3, said tube being in the shape of a frustum of a hollow cone.

5. A water kettle as described in claim 3, in which the diameter of the spout opening and the diameter of the bottom of the tube are substantially equal.

6. A device for dispensing liquids comprising a pouring spout, the lowest portion of said spout opening into a space above the normal level of liquid in the device, and a liquid inlet tube, the inlet tube being constituted by a walled chamber with two openings, one connecting said chamber with the atmosphere and one connecting said chamber with the space for the liquid below the normal level of liquid in the device, the inside diameter of the spout and the diameter of the opening connecting said chamber to the space for liquid being substantially equal.

7. A device for dispensing liquids comprising a pouring spout, the lowest portion of said spout opening into a space above the normal level of liquid in the device, and a liquid inlet tube, the inlet tube being constituted by a walled chamber with two openings, one connecting said chamber with the atmosphere and one connecting said chamber with the space for the liquid below the normal level of liquid in the device, said walls of said chamber being funnel-shaped.

PETER SCHLUMBOHM.

REFERENCES CITED

The following references are of record in the file of this patent:

UNITED STATES PATENTS

| Number | Name | Date |
|---|---|---|
| 56,367 | Carter | July 17, 1866 |
| 164,589 | Perkins | June 15, 1875 |
| 477,386 | Scott | June 21, 1892 |
| 754,046 | Bulmer | Mar. 8, 1904 |
| 947,025 | Pearl et al. | Jan. 18, 1910 |
| 1,018,854 | Utterback et al. | Feb. 27, 1912 |
| 1,299,963 | Laquai | Apr. 8, 1919 |
| 1,534,670 | Smith | Apr. 21, 1925 |
| 2,102,520 | De Montnorency | Dec. 14, 1937 |

FOREIGN PATENTS

| Number | Country | Date |
|---|---|---|
| 256,552 | Great Britain | Aug. 11, 1926 |
| 394,316 | Great Britain | May 28, 1935 |
| 575,104 | France | Apr. 12, 1924 |